United States Patent
Bourhani et al.

(10) Patent No.: US 11,954,101 B2
(45) Date of Patent: Apr. 9, 2024

(54) ABSTRACT QUERY LANGUAGE FOR LOW-CODE/NO-CODE ANALYTICAL APPLICATIONS

(71) Applicant: Accenture Global Solutions Limited, Dublin (IE)

(72) Inventors: Milad Bourhani, Bologna (IT); Marco Lazzarini, Rimini (IT)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 18/299,522

(22) Filed: Apr. 12, 2023

(65) Prior Publication Data
US 2023/0334043 A1  Oct. 19, 2023

Related U.S. Application Data

(60) Provisional application No. 63/331,587, filed on Apr. 15, 2022.

(51) Int. Cl.
  *G06F 7/00* (2006.01)
  *G06F 16/242* (2019.01)
  *G06F 16/248* (2019.01)

(52) U.S. Cl.
  CPC ........ *G06F 16/2445* (2019.01); *G06F 16/248* (2019.01)

(58) Field of Classification Search
  CPC ............. G06F 16/2428; G06F 16/2445; G06F 16/248; G06F 16/258; G06F 16/24578; G06F 16/26; G06F 16/2425; G06F 16/287; G06F 16/244; G06F 2206/00; G06F 2206/1008; G06F 40/186; G06F 3/048
  See application file for complete search history.

(56) References Cited

U.S. PATENT DOCUMENTS

| | | | | |
|---|---|---|---|---|
| 5,844,554 | A * | 12/1998 | Geller | ........................ G06F 8/34 715/962 |
| 8,359,574 | B1 * | 1/2013 | Bannur | ............... G06F 9/44505 711/138 |
| 10,949,171 | B1 * | 3/2021 | Chiluvuri | .................. G06F 8/73 |
| 11,275,567 | B1 * | 3/2022 | Chiluvuri | .............. G06F 9/5072 |
| 2010/0306195 | A1 * | 12/2010 | Wagener | ............ G06F 16/2423 715/764 |

(Continued)

OTHER PUBLICATIONS

Extended European Search Report issued on EP23167950.7 dated Jun. 1, 2023, 7 pages.

(Continued)

*Primary Examiner* — Mohammad A Sana
(74) *Attorney, Agent, or Firm* — Crowell & Moring LLP

(57) ABSTRACT

The disclosure provides a non-opaque, abstract, unified query language that exposes the query as a first-class citizen of the underlying architecture. The present disclosure thus facilitates the creation of no-code or low-code applications by enabling a level of collaboration between components that may be difficult to achieve if the language employed were opaque to the architecture. The disclosed query language may be considered "SQL-like," which may allow contributors familiar with structured query language (SQL) to effectively participate in the design of an application. The defined structures of a data objects of the non-opaque query language described herein are not-hidden and inspectable.

20 Claims, 8 Drawing Sheets

(56) References Cited

U.S. PATENT DOCUMENTS

2014/0164381 A1 6/2014 Sutton et al.
2021/0357398 A1* 11/2021 Balakavi ........... G06F 16/24578

OTHER PUBLICATIONS

Tiwari, Rishi et al., "ROC Bot: Towards Designing Virtual Command Centre for Energy Management", Tata Consultancy Services, Mumbai, India.

* cited by examiner

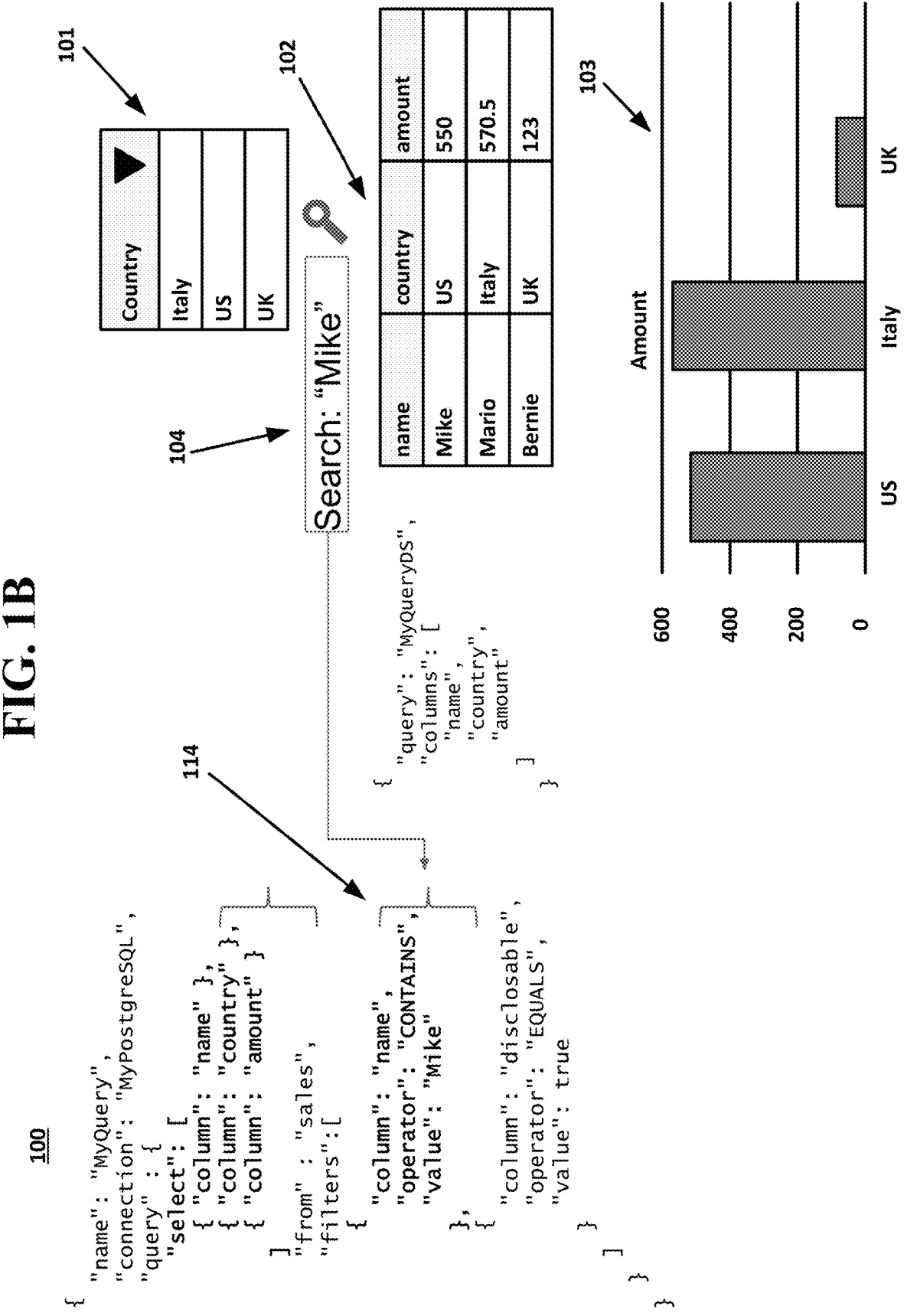

```
{ "select": [
    { "column":"name" },
    { "column":"country" },
    { "column":"amount" }
  ],
  "from" : "sales",
  "filters":[
    {
      "column":"country",
      "operator": "EQUALS",
      "value": "US"
    },
    {
      "column":"disclosable",
      "operator":"EQUALS",
      "value": true
    }
  ]
}
```

100

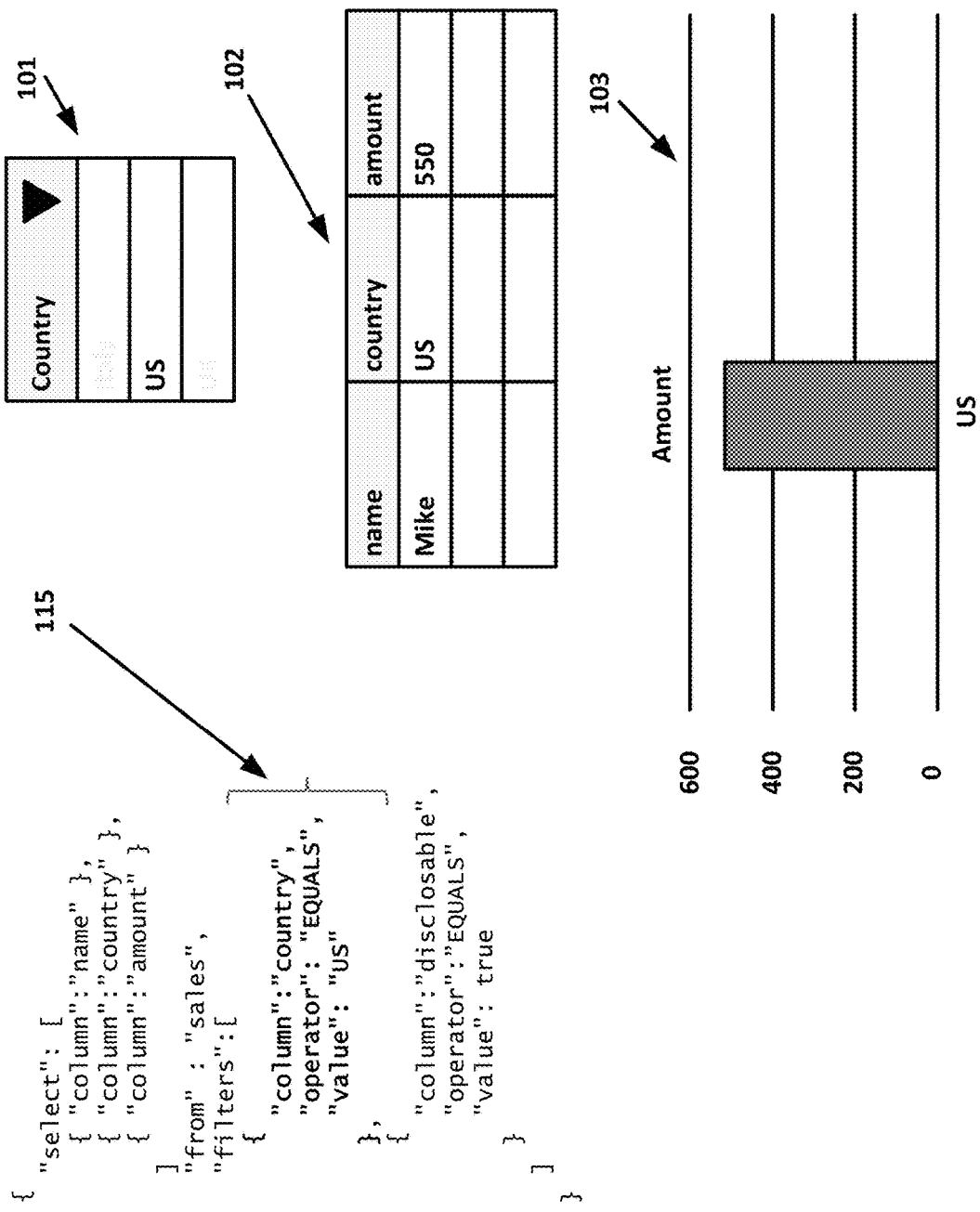

ABSTRACT QUERY LANGUAGE FOR LOW-CODE/NO-CODE ANALYTICAL APPLICATIONS

CROSS REFERENCE

This patent application is based on and claims the benefit of priority to U.S. Provisional Patent Application No. 63/331,587 filed on Apr. 15, 2022, which is herein incorporated by reference in its entirety.

BACKGROUND

Technical Field

The present subject matter relates to an abstract query language for data access that facilitates the construction of no-code/low-code analytical applications by enabling query-aware components to inspect, manipulate and collaborate over a shared query.

BACKGROUND TECHNOLOGIES

Present application development frameworks suffer from a variety of drawbacks, limitations, and disadvantages. For instance, present application development frameworks may utilize opaque query languages that prevent queries from being passed from one relational database management system to the other without performing an intermediate conversion, which reduces efficiency and overall system throughput. By the same token, tasks such as responding to selections of drop-down elements that operate on data across multiple relational database management systems may be made exponentially more complex without a suitable SQL syntax that supports this type of parameter injection. Accordingly, there is a need for inventive systems, methods, components, and apparatuses described herein.

BRIEF SUMMARY

According to the present subject matter, a method performed by a processing circuitry in an application development platform for constructing an analytical application is provided. The method may include providing a graphical application development user interface, receiving a first user command from a user via the graphical application development user interface to insert a user interface component into the analytical application, identifying a dataset retrievable from a datastore and consumable by the user interface component at a runtime of the analytical application via a second user command received in the graphical application development user interface, linking the dataset to the user interface component, determining a set of instructions for retrieving the dataset from the datastore, the set of instructions being agnostic to underlying database technologies used in the datastore, linking the set of instructions to the user interface component, and during the runtime of the analytical application and when instantiating the user interface component: converting the set of instructions into a series of database-specific queries; retrieving the dataset from the datastore based on the series of database-specific queries; and incorporating the dataset into the user interface component for display. The set of instructions may be expressed following syntactics of a common program language agnostic to the underlying database technologies. The common program language may comprise a JSON-like language. The user interface component may comprise a table, a dropdown list, or a data chart; and the set of instructions may specify at least one query operation for retrieving the dataset to populate the table, the dropdown list, or the data chart. The method may further include identifying the datastore; and displaying at least one portion of the datastore in the graphical application development user interface. The dataset may be identified via the second user command from the at least one portion of the datastore displayed in the graphical application development user interface. The second user command may comprise a user drag-and-drop operation of a list visual representation of the dataset displayed in the graphical application development user interface into a working panel in the graphical application development user interface. The datastore may be identified via a data source definition separate from the set of instructions. The data source definition may further comprise a filter for enforcing security and data protection. The set of instructions may be merged with data source definition prior to being converted into the series of database-specific queries. The method may further include, in response to receiving a user choice of a data item within the dataset in the user interface component during the runtime of the analytical application, injecting an additional filter associated with the data item into the set of instructions. The additional filter may be subscribable by at least one additional user interface component of the analytical application. The method may further include providing a filter subscription mechanism for the at least one additional user interface component of the analytical application to effectuate runtime filtering in the at least one additional user interface component based on the additional filter upon the user choice of the data item in the user interface component. The method may further include providing a live query subscription mechanism to the user interface component; and in response to detecting a change in the datastore that impacts the dataset associated with the user interface component and determining that the user interface component has subscribed to the live query subscription mechanism, refreshing the dataset of the user interface component when connected to the datastore. The method may further include injecting a use profiling filter into the set of instructions. The method may further include caching the dataset after being received from the datastore during the runtime of the analytical application.

According to the present subject matter, a system including processing circuitry configured to host an analytical application development platform is provided to provide a graphical application development user interface; receive a first user command from a user via the graphical application development user interface to insert a user interface component into an analytical application being constructed; identify a dataset retrievable from a datastore and consumable by the user interface component at a runtime of the analytical application via a second user command received in the graphical application development user interface; link the dataset to the user interface component; determine a set of instructions for retrieving the dataset from the datastore, the set of instructions being agnostic to underlying database technologies used in the datastore; link the set of instructions to the user interface component; and during the runtime of the analytical application and when instantiating the user interface component: convert the set of instructions into a series of database-specific queries; retrieve the dataset from the datastore based on the series of database-specific queries; and incorporate the dataset into the user interface component for display. The set of instructions may be expressed following syntactics of a common program language agnostic to the underlying database technologies. The common program language may include a JSON-like language. The user interface component may include a table, a dropdown list, or a data chart; and the set of instructions may specify at least one query operation for retrieving the dataset to populate the table, the dropdown list, or the data chart. The processing circuitry may be further configured to: identify the datastore; and display at least one portion of the datastore in the graphical application development user interface; and the dataset may be identified via the second user command from the at least one portion of the datastore displayed in the graphical application development user interface. The second user command may include a user drag-and-drop operation of a list visual representation of the dataset displayed in the graphical application development user interface into a working panel in the graphical application development user interface. The datastore may be identified via a data source definition separate from the set of instructions. The data source definition may further include a filter for enforcing security and data protection. The set of instructions may be merged with data source definition prior to being converted into the series of database-specific queries. The processing circuitry may be further configured to: in response to receiving a user choice of a data item within the dataset in the user interface component during the runtime of the analytical application, inject an additional filter associated with the data item into the set of instructions. The additional filter may be subscribable by at least one additional user interface component of the analytical application; and the processing circuitry may be further configured to provide a filter subscription mechanism for the at least one additional user interface component of the analytical application to effectuate runtime filtering in the at least one additional user interface component based on the additional filter upon the user choice of the data item in the user interface component. The processing circuitry may be further configured to: provide a live query subscription mechanism to the user interface component; and in response to detecting a change in the datastore that impacts the dataset associated with the user interface component and determining that the user interface component has subscribed to the live query subscription mechanism, refresh the dataset of the user interface component when connected to the datastore. The processing circuitry may be further configured to inject a use profiling filter into the set of instructions. The processing circuitry is further configured to cache the dataset after being received from the datastore during the runtime of the analytical application.

BRIEF DESCRIPTION OF THE DRAWINGS

FIG. 1B shows an example search component among the visual components according to the present subject matter.

FIG. 1D shows an example of live query according to the present subject matter.

DETAILED DESCRIPTION

Figure 1A:
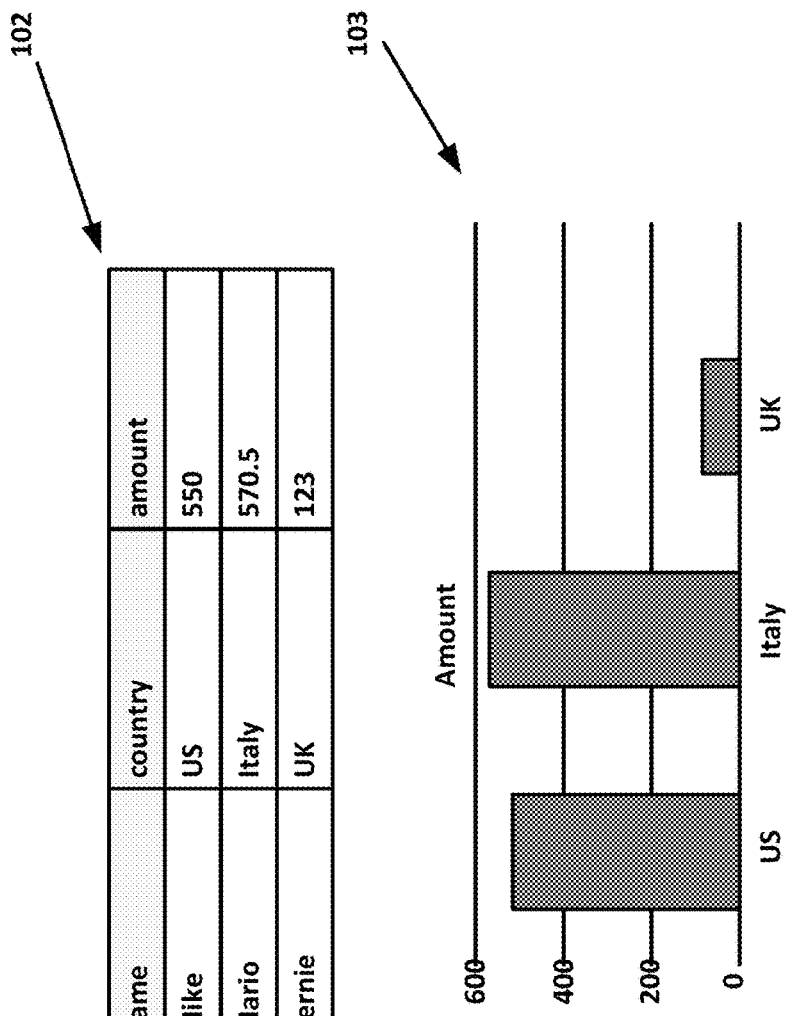
FIG. 1A illustrates an example of visual components according to the present subject matter.

This system will now be described in detail hereinafter with reference to the accompanied drawings, which form a part of the present disclosure, and which show, by way of illustration, examples of embodiments. The system may, however, be embodied in a variety of different forms and, therefore, the disclosure is intended to be construed as not being limited to the embodiments set forth. Further, the disclosure may be embodied as methods, devices, components, or systems. Accordingly, embodiments of the disclosure may, for example, take the form of hardware, software, firmware or any combination thereof.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

The present subject matter may provide a non-opaque, abstract, unified query language that exposes the query as a first-class citizen of the underlying architecture. The present subject matter thus facilitates the creation of no-code or low-code applications by enabling a level of collaboration between components that may be difficult to achieve if the language employed were opaque to the architecture. The disclosed query language may be considered "SQL-like," which may allow contributors familiar with structured query language (SQL) to effectively participate in the design of an application. The term "opaque" is used herein to mean that concrete structure of data or other program elements is not known by the framework, and cannot therefore be inspected or manipulated by the framework. The defined structures of a data objects of the non-opaque query language described herein are thus not-hidden and inspectable.

Prior application development frameworks may employ query language that is opaque, and the information flow between the components and the query may be unidirectional. That is, the components may feed their values into parameters defined in a parameterized SQL query, which may be disadvantageous in at least two aspects. In the first aspect, the application design, which includes the query, may change when switching from one database to another (e.g., Oracle to SQL Server). The present subject matter may solve this problem by adopting an abstract, database-agnostic query language where any database-specific translation may be provided as a plugin or extension to the disclosed query language.

A second disadvantageous aspect of prior application development frameworks may be that integration between the query and the components may be constrained by the expressive power of SQL. Tasks that should be simple, such as responding to selections made on drop-down elements, may well require the SQL to become exponentially more complex with every additional interaction. For a component to implement its behavior, it would be desirable to use a suitable SQL syntax that supports that kind of parameter injection, which may not be the case, especially in relation to the flexibility of the underlying data integration platform (e.g., Java EE). For example, the application designer may not find it easy to implement filtering and pagination on a table component across different database implementations.

Another difference between some prior application development frameworks and the framework described herein may be that the central element of the design in the current application development frameworks is the query rather than a data model. For instance, some prior application development frameworks may allow the use of DAX queries to implement row-level security, but these queries may not be the central element of the architecture. Instead, these queries may be a byproduct of the data model, defined separately from it, which may introduce a disconnection in the design.

In some prior application development frameworks, the element of collaboration between components may be the data model, not the query. By comparison, the query-based solution described in accordance with the present subject matter may offer a flexible approach whereby designers that are familiar with SQL may more directly drive the behavior of the visual components (e.g., by defining the query and the associated aggregations and filters rather than the model attributes). Additionally, by adopting the abstract query language as a common language used for design, component interaction, and row-level security, effective collaboration may be promoted between designers and developers, which may make the integration between the end-user functionalities and the security-related features more linear and manageable. An application development framework could adopt the abstract query language of the present subject matter and build visual editors to generate abstract queries, but, unlike prior attempts, the translation between the abstract query and the database-specific query may be totally bi-directional, which may improve effectiveness and collaboration.

The abstract query language and associated framework of the present subject matter may leverage the familiarity that many designers may have with SQL along with the advantages of visual design without the outlined drawbacks. The present subject matter may also be much more open and flexible in that it adapts to different databases and data stores by design.

Adopting a unified data access language that can be "manipulated as data" may allow components in the whole stack to understand and interact with the criteria that result from visual components configuration, components interaction, end user choices, profiling, and access control.

The present subject matter describes an approach to creating a framework to accelerate the creation of no-code/low-code analytical applications. A goal of the disclosed analytical application framework in accordance with present subject matter may be to help designers create analytical applications faster as opposed to creating them "from scratch."

As used herein, "analytical applications" refer to applications that aid business decisions, driven by processing data. Analytical applications may typically employ online analytical processing (OLAP) and BI technologies, as opposed to online transaction processing (OLTP).

As used herein, "no-code/low-code" refers to creating a new application without writing any code by writing minimum amount of code—i.e., via declarative wiring only, or by at least minimizing the code that needs to be written. This contrasts with conventional, imperative, code-driven techniques.

The application development framework of the present subject matter may come in many different forms and may provide a wide range of different tools to create an application, possibly targeting one or more end-user technologies, such as web applications, mobile, and desktop applications. The framework may offer different types of components. Such components may be considered the building blocks that teams can use to build applications. Many infrastructural aspects may be abstracted away by the framework, which may provide the infrastructure configuration-driven connectors out of the box (a la Hexagonal Architecture). In addition to providing components, the framework may also offer a way to connect the components together in a desired way. The connecting of components together may be referred to as "wiring." Many applications may also have logic that is unique, representing a competitive advantage. The disclosed framework may accommodate that unique logic by providing adopters with a way to express it.

The application development framework may offer sets of visual components for the development teams to utilize in creating user interfaces (UIs) for their applications. An emerging theme in the context of application development frameworks are Design Language Systems (DLSs). By adopting a DLS, an application development framework may provide the development teams with best-of-breed user experience, accessibility, consistency, themes, and brand recognition.

In an analytical application, data may be the main driver for decisions, and therefore may sit at the center of the application. Analytical application frameworks may make it easier to connect to a large variety of data sources. Data at the center of the application may support business decisions; e.g., business logic. Analytical applications may typically require capabilities such as OLAP and BI, as opposed to OLTP applications. While some analytical application frameworks may put data at the center of the architecture and design, different frameworks may achieve so in different ways. For example, some may put the so-called "data model" at the center, while possibly offering query capabilities as a more marginal addition.

Infrastructure code may represent a main source of complexity in applications, hiding the business logic (i.e., the competitive advantage), hindering its potential for growth, agility, and maintenance. Well-designed code may keep the business logic focused, while pushing infrastructure at the edge of the architecture (a la Hexagonal architecture). Application development frameworks may ideally remove the need of infrastructure code, replacing it with configuration. While many frameworks may employ configuration for wiring, some may leave code for business logic. Framework upgrades may suffer from a code-centric, imperative approach. A configuration-driven, declarative approach makes upgrades much easier (e.g., by evolving JSON on the fly). Code written using a declarative approach may focus on "the desired end result" rather than the mechanical steps to achieve it. A declarative approach, as opposed to an imperative one, may make the business logic more robust and maintainable.

A no-code approach may take the declarative approach to the extreme, by removing code from all aspects of the application and replacing the code with a well-formed, configuration-like language (e.g., JSON, YAML, Dhall). A low-code approach may recognize that some code might be needed but may minimize the need of it by handling most aspects of the application in a declarative way.

Application development frameworks, especially no-code or low-code frameworks, may offer a set of APIs (e.g., REST) to access the capabilities they provide, especially data access via—e.g., queries. Since frameworks for analytical applications may focus on data, the frameworks may need to offer their users (e.g., the designers and developers creating applications) full-fledged APIs to access data. Since not everyone on a team may be a coder, offering a no-code approach, or minimizing the need to code in accordance with the present subject matter may, broaden the audience of those who can contribute to an application, thereby "democratizing" the tool.

The approach described herein may be based on a structured, well-defined, JSON-like common language to represent data access and may sit at the center of the application, rather than left as a by-product of the data model. The approach described herein may be an integral part of Data Access APIs, which may be consumable both from code in a low-code approach and from components (via configuration) in a no-code fashion. As used herein, the term "consumable" refers to being able to be operated on, being able to be input, or otherwise being usable by another component. The approach described herein may promote low-code/no-code by abstracting away mechanics that would be otherwise done via boilerplate code. The approach described herein may be abstract in that it works by design (i.e., no dialects). The approach described herein may be inspectable and non-opaque, unlike SQL. The approach described herein may be homoiconic in that the (query) language "can be manipulated as data" (à la Clojure). The approach described herein may not need parsing, which may make it more robust and lightweight like an Abstract Syntax Tree (AST). The approach described herein may be transferred across tiers, manipulated, and used without (risk of) losing information The snippet below may provide an example query language using JSON:

```
{                               [
  "select": [                     {
    {                               "country": "US",
      "column":"name"               "amount": 550,
    },                              "name": "Mike"
    {                             },
      "column":"country"          {
    },                              "country": "Italy",
    {                               "amount": 570.5,
      "column":"amount"             "name": "Mario"
    }                →            },
  ],                              {
  "from" : "sales",                 "country": "UK",
  "filters":[                       "amount": 123,
    {                               "name": "Bernie"
      "column":"age",             }
      "operator":"GT",          ]
      "value":30
    }
  ]
}
```

On the UI, the abstract query language of the present subject matter may enable no-code data consumption and collaborative interaction between query-aware visual components a "level below the DLS." Components may be data agnostic, DL-compliant, and reusable. Data injection may occur via wiring and integration; e.g., fetching data specified by a query.

The data sources used in accordance with the present subject matter may be query-aware. In the example snippet below, "MyQueryDS" may be a query-aware data source.

```
{
  "name": "MyQueryDS",
  "connection": "MyPostgreSQL",
  "query" : {
    "from" : "sales",
    "filters":[
      {
        "column": "disclosable",
        "operator": "EQUALS",
        "value": true
      }
    ]
  }
}
```

Query-aware data sources refer to named associations between queries and database connections that enable the application development framework to issue the query on a given physical data store.

A "connection," as used herein, refers to a named pointer to the information needed by the application development framework to connect to a data store (e.g., a database). Components may refer to this information by name. The "from" table and the filter on the "disclosable" column in the example snippet above may be an example of Row-level security (RLS).

RLS may be achieved by defining the "table" and "filters" query elements as part of the query-aware data source. Regardless of the queries that individual components issue, the query API layer may honor the source "table" and "filters" elements. Referring to the example snippet below, the "table" element may not be specified or overridden by a data access query request issued by a component. For instance, the API may reject a request containing the "table" element, or silently ignore it. Filters may be in AND conjunction with each other, so specifying additional filters when calling the API will not bypass the ones that are defined in the data source, thus achieving RLS.

```
{
  "name": "MyQueryDS",
  "connection": "MyPostgreSQL",
  "query" : {                    ...
    "from" : "sales",
    "filters":[
      {
        "column": "disclosable",
        "operator": "EQUALS",
        "value": true
      }
    ]                            ...
  }
}
```

Each component may consume a query data source in different ways to achieve its goal—e.g., to present data. A query data source-aware data access API may fetch data based on abstract queries. The query request may be comprised of query fragments (e.g., just a "select") and may not include the "from" element. The data access API may then merge these query fragments with the underlying "from" and "filters" elements that exist in a data source definition to produce results. These definitions may not be overridden by a component's query request to enforce security and data protection.

A component may specify the "select" fragment to define the final shape of the data to adapt to the component's needs. For example, a drop-down component may define its own "select" to perform a distinct fetch on a column, while a chart component can define its own "grouping" to perform a group-by query to display aggregated numbers.

Leveraging the ability to treat the query as data (homoiconicity), a shared set of page query filters may act as a whiteboard for components to inject behavior. A component may inject query filters into a shared set of page query filters, and then post the change onto the shared query for the other components to consume. For instance, a drop-down component may reflect a user's choice onto the data that is then fed into the other visual components on a page. A component may listen to page query filters changes to react and show updated data. In this way, the component may be understood to be subscribed. Components may subscribe to changes to the page query filters and have the changes reflected on the data they display. The page query filters may be added to a component's query requests before invoking the data access API.

FIG. 1A illustrates an example of visual components 101-103. Components 101-103 may be wired together with the query via configuration. Each component 101-103 may specify the metadata it needs to utilize from the query via a respective snippet 111-113 as shown.

Component 101 may be a drop-down box. As an example, component 102 may be a table displaying several users (e.g., Mike, Mario, Bernie), country, and the amount of their respective sales. Component 103 may be a bar graph illustrating sales amounts versus country.

Drop-down component 101 may specify the 'select' fragment to retrieve distinct values of, for example, the "country" column. The API may merge it with the underlying query to produce results. The finalized query may appear as provided in the example snippet below:

```
{
  "select": [
    {
      "aggregation": "DISTINCT",
      "column": "country",
      "type": "AGGREGATION"
    }
  ]
  "from" : "sales",
  "filters": [
    {
      "column": "disclosable",
      "operator": "EQUALS",
      "value": true
    }
  ]
}
```

FIG. 1B shows how a search component 104 may be utilized and reflected in generating the respective snipped 114 of the finalized query.

Figure 1C:
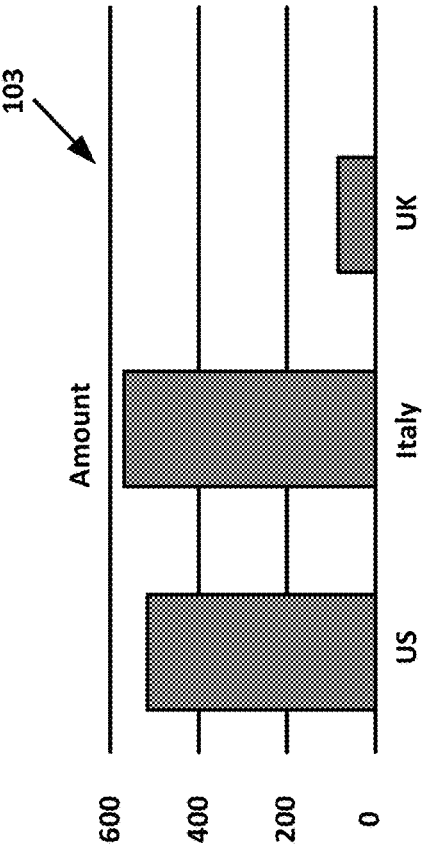
FIG. 1C shows an example selection being made using a drop-down component according to the present subject matter.

A component may add query "filters" resulting from user choices on the component. For instance, a table component may add a filter to reflect the user using a table's "search" functionality. FIG. 1C shows selections may be made by the user (e.g., selecting "US" as the country), which may cause the drop-down component 101 to add filters 115 into the page query filters. These filters 115 may be injected on the fly into the synthesized code when invoking the data API.

Figure 2A:
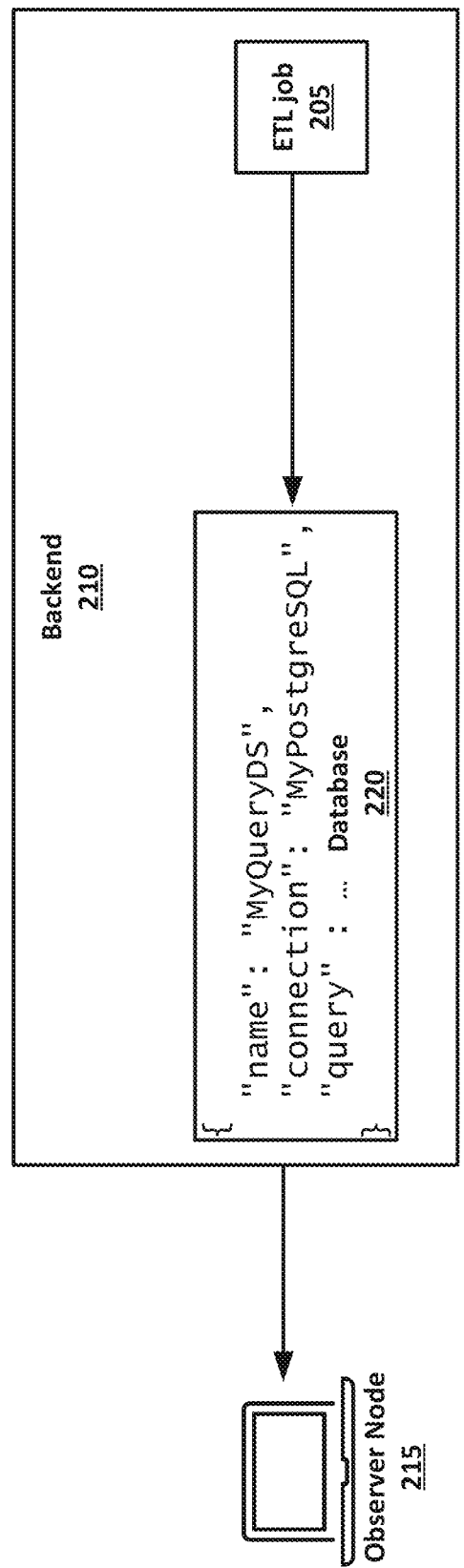
FIG. 2A shows an example ETL job applying changes to a database and to an observer node according to the present subject matter.
Figure 2B:
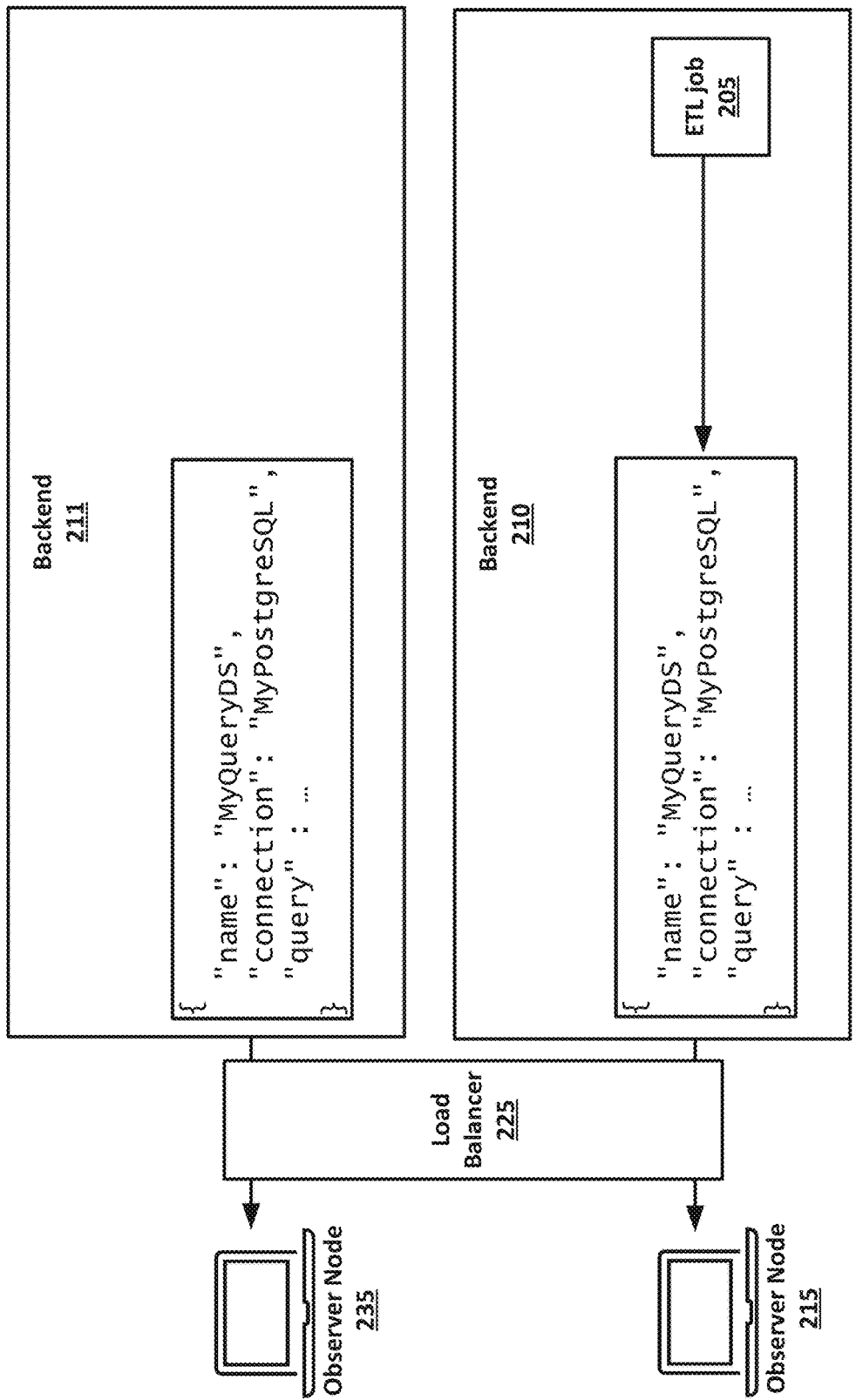
FIG. 2B shows an example of back end nodes in a cluster propagating changes through a load balancer to observer nodes according to the present subject matter.

On the back-end, the abstract query language of the present subject matter may enable "live queries" and may promote type-safe(r) low-code access. As the results of the query-aware data source changes—i.e., changes to the "connection", "from" or "filters" elements—or the query itself changes, observers (e.g., observer nodes 215 of FIG. 2, as described later below) may subscribe to "live queries." Components on the UI may also subscribe—e.g., via Server-Sent Events or Web Sockets—and refresh their data accordingly, for example, by issuing their query requests again. For instance, FIG. 1D shows how modifying the contents of component 102 to delete all other cells' data except for Mike may be reflected and refreshed in component 103. As a further example shown schematically in FIG. 2A, extract-transform-load (ETL) jobs 205 may perform changes to a database 220 and then trigger changes to impacted query-aware data sources (i.e., all data sources whose "from" elements are impacted by the job, observer nodes 215, etc.). As further shown in FIG. 2B, back-end nodes 210, 211 in a cluster may also listen to propagate changes on all observer nodes 215, 235 behind load balancers 225, which in turn may update their connected UIs.

Figure 2C:
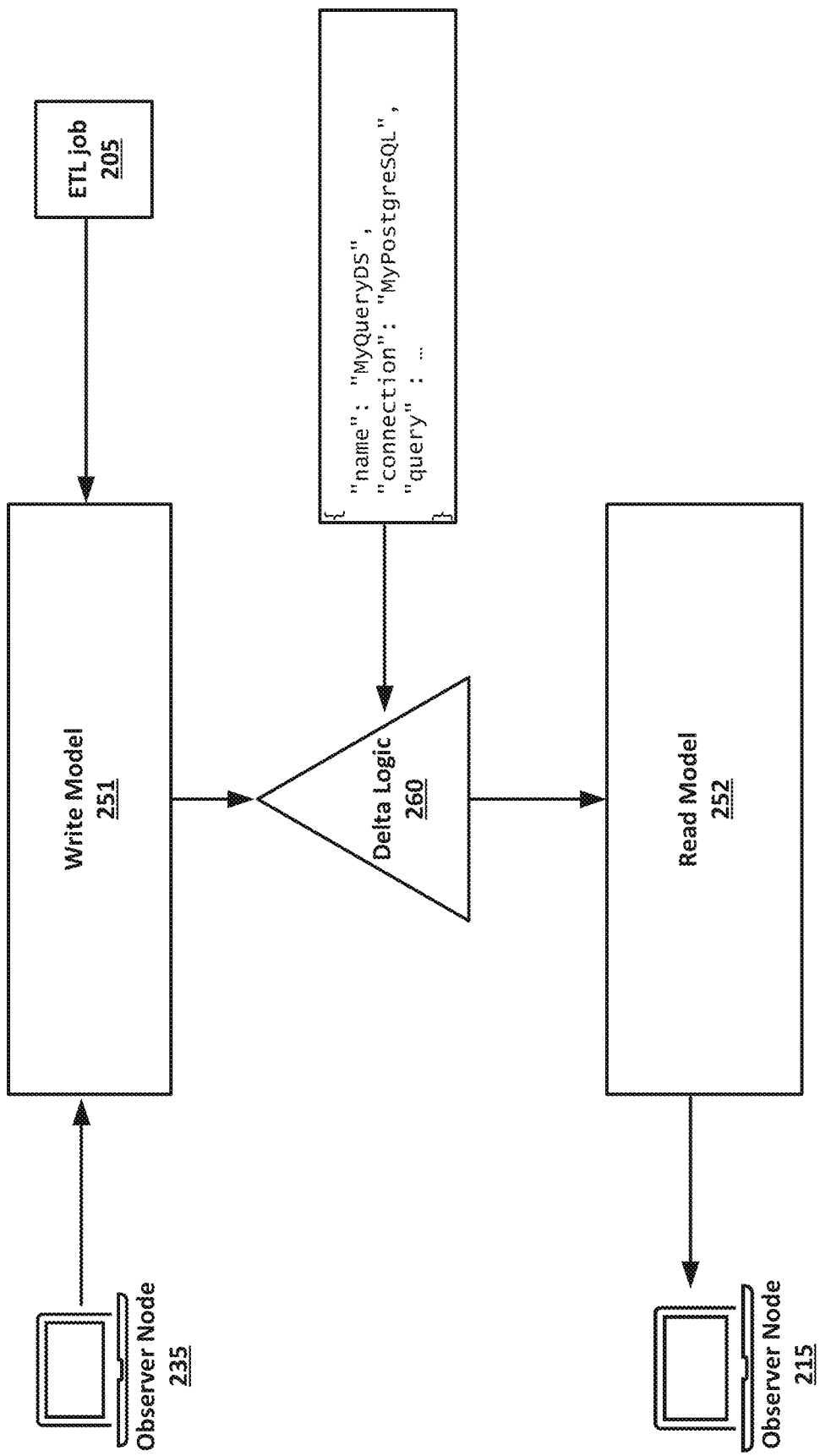
FIG. 2C shows an example CQRS architecture according to the present subject matter.

FIG. 2C shows an example Command and Query Responsibility (CQRS) architecture. The physical data model behind a query data source may represent the Read model in the CQRS architecture. That is, the table(s) may be designed for fast, concurrent reads, while allowing efficient writes on the Write model 251, with reconciliation in between. When the Write Model 251 changes, a query data source-aware delta logic 260 may sit in between the Write model 251 and the Read model 252, to optimize Read model 252 updates. For instance, models not using given tables may skip the updates. Live queries may also enable semantic, "AST-like" changes rather than just "query changed." For instance, "added filter on column X>42 for table Y"—to ignore non-impacting changes.

As per CQRS, if the query data source is impacted by the change, the Read Model may be re-computed to optimize reads.

The query language may be represented (a.k.a., embedded) in many different notations without loss of information, such as JSON, Java Record Types, Haskell or Scala Abstract Data Types (ADTs), etc. The ability to represent queries with constructs embedded in the language may enable expressive APIs and, where supported by the language, type-safe data consumption (à la LINQ). The query language may also work on front-end libraries provided by the framework, using type-safe approaches such as TypeScript or Elm. Example approaches in accordance with the present subject matter are provided in the snippets below:

```
// Using Java 17 or later, and the library Vavr
public record Query(
    List<Select> select,
    Table from,
    List<Filter> filters,
    List<Join> joins,
    List<Column> grouping,
```

```
    List<Filter> having,
    List<Ordering> ordering,
    Option<Page> page
) { }
public sealed interface Select { }
record SelectColumn(Column column) implements Select { }
public sealed interface Column<T> { }
record StringColumn(String name) implements Column<String> { }
record IntColumn(String name) implements Column<Integer> { }
record BoolColumn(String name) implements Column<Boolean> { }
public <T1, T2, T3> List<Tuple3<T1, T2, T3>> query(
    Column<T1> c1, Column<T2> c2, Column<T3> c3
) {
  Query query = new Query(
      List.of(
        new SelectColumn(c1),
        new SelectColumn(c2) ,
        new SelectColumn(c3)),
      new Table("sales"),
      List.of(new ColumnFilter(
        new BoolColumn("disclosable"), Op.EQ, true)),
      List.of( ), List.of( ), List.of( ), List.of( ), Option.none( ))
    return db.fetch(query); // Checks columns have the right type
}
List<Tuple3<String, String, Integer>> typeSafeResult =
    queries.query(new StringColumn("name"),
        new StringColumn("country"),
        new IntColumn("amount"));
public interface DB {
  <T1, T3, T2> List<Tuple3<T1, T2, T3>> fetch(Query query);
}
```

A cache layer may be defined in front of the data access API for performance reasons. A cache may maintain the notion of the queries whose results have been already computed. Being non-opaque, queries may be easily matched. Caches may compute subsets in-memory. The snippets below provide examples of caching in accordance with the present subject matter:

```
// Cached
{
  "select": [
    { "column": "name" },
    { "column": "country" },
    { "column": "amount" }
  ]
  "from" : "sales",
  "filters":[
    {
      "column": "disclosable",
      "operator": "EQUALS",
      "value": true
    }
  ]
}
// This can be computed in memory from the cached query
{
  "select": [
    { "column": "name" },
    { "column": "country" },
    { "column": "amount" }
  ]
  "from" : "sales",
  "filters":[
    {
      "column": "country",
      "operator": "EQUALS",
      "value": "US"
    },
    {
      "column": "disclosable",
      "operator": "EQUALS",
      "value": true
    }
  ]
}
```

The data access API may likely require a user to be specified when issuing query requests for auditing, access control and profiling reasons. The API layer may reject (e.g., with a 403 HTTP status) queries for which the user does not have clearance. Columns and filters in a query request may be inspected to check the access level of the user. The API layer may maintain audit logs to track data access made by users. Examples are provided in the snippets below:

```
// User has no clearance over sales in the US
{
  "select": [
    { "column": "name" },
    { "column": "country" },
    { "column": "amount" }
  ]
  "from" : "sales",
  "filters":[
    {
      "column": "country",
      "operator": "EQUALS",
      "value": "US"
    }
  ]
}
// User has clearance, OK
{
  "select": [
    { "column": "name" },
    { "column": "country" },
    { "column": "amount" }
  ]
  "from" : "sales",
  "filters":[
    {
      "column": "country",
      "operator": "EQUALS",
      "value": "Italy"
    }
  ]
}
// No clearance
  "select": [
    { "column": "name" }
    { "column": "country"
    { "column": "amount"
  ]
  "from" : "sales",
  "filters":[ ]
}
```

Filters may be injected for profiling reasons, for example, using the current user's location to select data. Examples are provided in the snippets below:

```
// User is in the US                  // user is in Italy
{                                     {
  "select": [                           "select": [
    { "column": "name" },                 { "column": "name" },
    { "column": "country" },              { "column": "country" },
    { "column": "amount" }                { "column": "amount" }
  ]                                     ]
  "from" : "sales",                     "from" : "sales",
  "filters":[                           "filters":[
```

```
    {                              {
        "column": "country",           "column": "country",
        "operator": "EQUALS",          "operator": "EQUALS",
        "value": "US"                  "value": "Italy"
    } ]                            } ]
}                              }
```

Various forms of validation may be provided in accordance with the present subject matter. In syntactic validation, the query may have a well-defined grammar and, can be validated, also on the client, before issuing the actual query. In semantic validation, the semantic validation, the API implementation may retrieve database metadata beforehand, possibly caching it, and may, for example, check that the table and columns exist without even calling to the database, which may be an expensive operation. Security and performance validation guard against SQL Injection via fine-grained validation and guard against denial-of-service (DOS) attacks via semantic validation, for example, by imposing minimum set of filters or pagination. Examples are provided in the snippets below:

```
// Rejected: SQL injection
{
    "select": [
        { "column": "name" },
        { "column": "country" },
        { "column": "amount" }
    ]
    "from" : "sales",
    "filters":[
        {
            "column": "name",
            "operator": "EQUALS",
            "value": "Robert; DROP TABLE STUDENTS; --"
        }
    ]
}
// Rejected: no filters, no pagination: too many rows
{
    "select": [
        { "column": "name" },
        { "column": "country" },
        { "column": "amount" }
    ]
    "from" : "sales"
    "filters":[ ]
}
```

The translation from the abstract query to the actual query language (e.g., SQL Server) may be open for extension using a plugin architecture. Support for specific SQL dialects may also be plugged in and detected by the API via DB metadata to match the DB vendor with the plugin specification. The translation may support a large variety of data stores by translating into SQL, NoSQL (e.g., MongoDB aggregation framework via Apache Calcite), DAX, etc.

A strength of the disclosed subject matter may be the ability to leverage knowledge of SQL to build the abstract queries, since they still resemble SQL and are semantically based on the relational model. However, some users might benefit from visual builders to define data access for visual components—e.g., by selecting tables and columns, dragging and dropping them onto a canvas, etc. Once the selections have been made on the visual tool, the abstract query can be generated, but this translation may operate in the reverse direction, as well, without loss of information, enabling the user to operate at the two levels of abstraction seamlessly. Thus, the translation may be considered bidirectional. Abstract queries may also be parsed on the fly starting from the subset of standard SQL that the abstract query language represents—again, without loss of information. This may be useful for users that are accustomed to writing actual SQL (e.g., developers or data analysts).

The various implementations described above are further related to U.S. patent application Ser. Nos. 15/420,947 and 16/902,931, filed on Jan. 31, 2017 and Jun. 16, 2020, respectively. The disclosure of these prior patent applications is herein incorporated by reference in their entireties.

Figure 3:
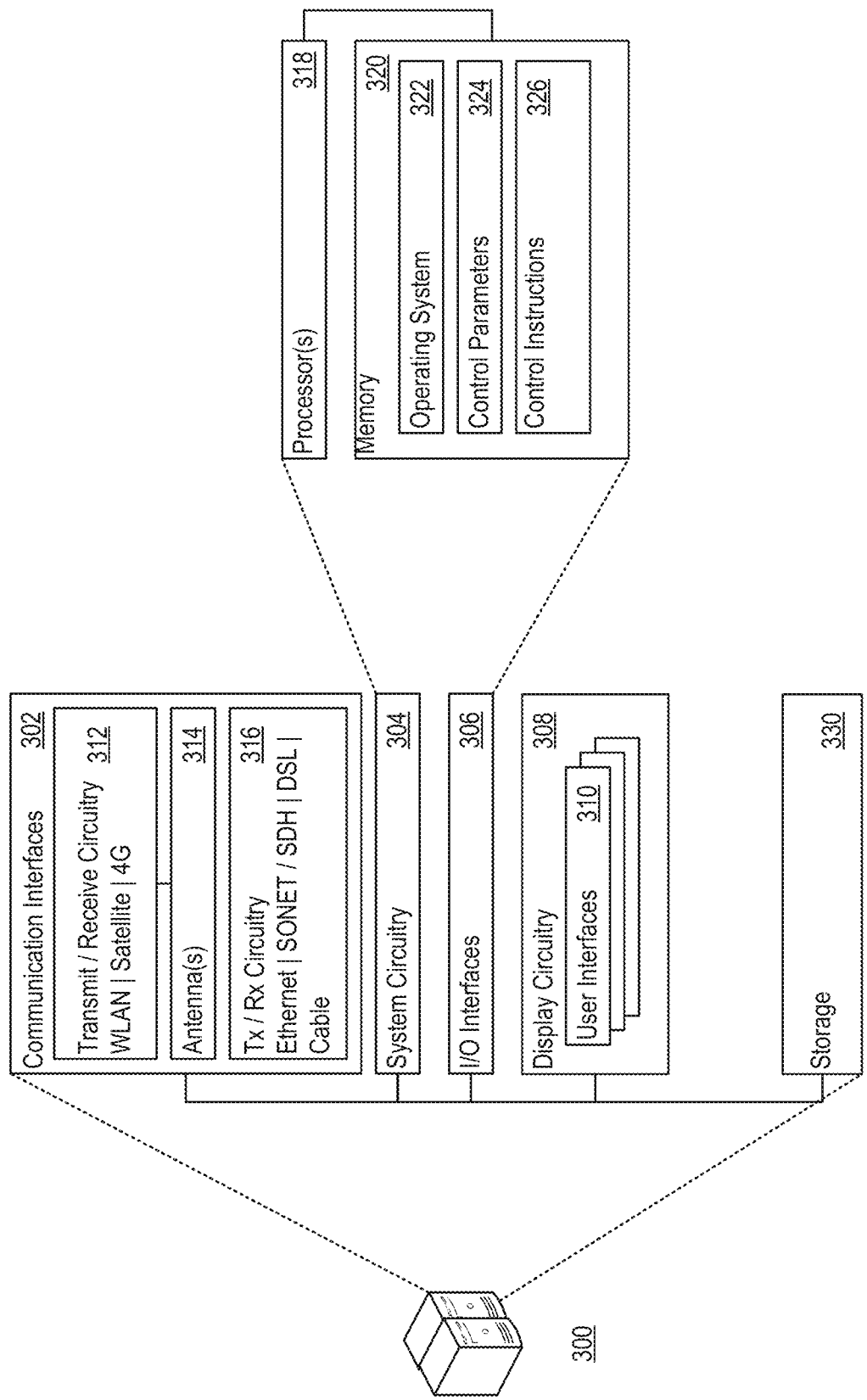
FIG. 3 shows an example computing device that may be used to implement various computing components of the systems described.

FIG. 3 illustrates an example architecture of a computing device 300 on which the various computing components of the system described above. The computing device 300 may include communication interfaces 302, system circuitry 304, input/output (I/O) interface circuitry 306, and display circuitry 308. The graphical user interfaces (GUIs) 310 displayed by the display circuitry 308 may be used to receive user commands/input and to display various outputs. The GUIs 310 may be displayed locally using the display circuitry 308, or for remote visualization, e.g., as HTML, JavaScript, audio, and video output for a web browser running on a local or remote machine.

The GUIs 310 and the I/O interface circuitry 306 may include touch sensitive displays, voice or facial recognition inputs, buttons, switches, speakers and other user interface elements. Additional examples of the I/O interface circuitry 306 includes microphones, video and still image cameras, headset and microphone input/output jacks, Universal Serial Bus (USB) connectors, memory card slots, and other types of inputs. The I/O interface circuitry 306 may further include magnetic or optical media interfaces (e.g., a CDROM or DVD drive), serial and parallel bus interfaces, and keyboard and mouse interfaces.

The communication interfaces 302 may include wireless transmitters and receivers ("transceivers") 312 and any antennas 314 used by the transmit and receive circuitry of the transceivers 312. The transceivers 312 and antennas 314 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 302 may also include serial interfaces, such as universal serial bus (USB), serial ATA, IEEE 1394, lighting port, I2C, slimBus, or other serial interfaces. The communication interfaces 302 may also include wireline transceivers 316 to support wired communication protocols. The wireline transceivers 316 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 304 may include any combination of hardware, software, firmware, APIs, and/or other circuitry. The system circuitry 304 may be implemented, for example, with one or more systems on a chip (SoC), application specific integrated circuits (ASIC), microprocessors, discrete analog and digital circuits, and other circuitry. The system circuitry 304 may implement any desired functionality of the disclosed system and its various components. As just one example, the system circuitry 304 may include one or more instruction processor 318 and memory 320.

The memory 320 may be implemented as a non-transitory memory circuit and may store, for example, control instructions 322 for implementing the various functions described above, as well as an operating system 321. In one implementation, the processor 318 executes the control instructions 322 and the operating system 321 to carry out any desired functionality of the adaptive federated learning process above.

The computing device 300 may further include various data sources 330, or may be in communication with external data sources. Each of the databases that are included in the data sources 330 may be accessed by the various component of the disclosed system and its components.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

The subject matter of the disclosure may also relate, among others, to the following aspects:

A first aspect relates to a method performed by a processing circuitry in an application development platform for constructing an analytical application, the method comprising: providing a graphical application development user interface; receiving a first user command from a user via the graphical application development user interface to insert a user interface component into the analytical application; identifying a dataset retrievable from a datastore and consumable by the user interface component at a runtime of the analytical application via a second user command received in the graphical application development user interface; linking the dataset to the user interface component; determining a set of instructions for retrieving the dataset from the datastore, the set of instructions being agnostic to underlying database technologies used in the datastore; linking the set of instructions to the user interface component; and during the runtime of the analytical application and when instantiating the user interface component: converting the set of instructions into a series of database-specific queries; retrieving the dataset from the datastore based on the series of database-specific queries; and incorporating the dataset into the user interface component for display.

A second aspect relates to the method of aspect 1, wherein the set of instructions are expressed following syntactics of a common program language agnostic to the underlying database technologies.

A third aspect relates to the method of any preceding aspect, wherein the common program language comprises a JSON-like language.

A fourth aspect relates to the method of any preceding aspect, wherein: the user interface component comprises a table, a dropdown list, or a data chart; and the set of instructions specify at least one query operation for retrieving the dataset to populate the table, the dropdown list, or the data chart.

A fifth aspect relates to the method of any preceding aspect, wherein: the method further comprises: identifying the datastore; and displaying at least one portion of the datastore in the graphical application development user interface; and the dataset is identified via the second user command from the at least one portion of the datastore displayed in the graphical application development user interface.

A sixth aspect relates to the method of any preceding aspect, wherein the second user command comprises a user drag-and-drop operation of a list visual representation of the dataset displayed in the graphical application development user interface into a working panel in the graphical application development user interface.

A seventh aspect relates to the method of any preceding aspect, wherein the datastore is identified via a data source definition separate from the set of instructions.

An eighth aspect relates to the method of any preceding aspect, wherein the data source definition further comprises a filter for enforcing security and data protection.

A ninth aspect relates to the method of any preceding aspect, wherein the set of instructions are merged with data source definition prior to being converted into the series of database-specific queries.

A tenth aspect relates to the method of any preceding aspect, wherein the method further comprises: in response to receiving a user choice of a data item within the dataset in the user interface component during the runtime of the analytical application, injecting an additional filter associated with the data item into the set of instructions.

An eleventh aspect relates to the method of any preceding aspect, wherein: the additional filter is subscribable by at least one additional user interface component of the analytical application; and the method further comprises providing a filter subscription mechanism for the at least one additional user interface component of the analytical application to effectuate runtime filtering in the at least one additional user interface component based on the additional filter upon the user choice of the data item in the user interface component.

A twelfth aspect relates to the method of any preceding aspect, wherein the method further comprises: providing a live query subscription mechanism to the user interface component; and in response to detecting a change in the datastore that impacts the dataset associated with the user interface component and determining that the user interface component has subscribed to the live query subscription mechanism, refreshing the dataset of the user interface component when connected to the datastore.

A thirteenth aspect relates to the method of any preceding aspect, wherein the datastore comprises a cluster of back-end nodes, the cluster of back-end nodes being configured with listen to and propagate changes on all nodes of the cluster of back-end nodes under a load balancer.

A fourteenth aspect relates to the method of any preceding aspect, wherein a query data source-aware delta logic is configured in between the write model and the read model to, when the write model changes, optimize the read model updates such that read the read model updates are skipped when the read model does not use data associated with the write model.

A fifteenth aspect relates to the method of any preceding aspect, wherein semantic write model changes are skipped in the read model updates.

A sixteenth aspect relates to the method of any preceding aspect, wherein the method further comprises injecting a use profiling filter into the set of instructions.

A seventeenth aspect relates to the method of any preceding aspect, wherein the method further comprises caching the dataset after being received from the datastore during the runtime of the analytical application.

An eighteenth aspect relates to the method of any preceding aspect, further comprising automatically performing syntactic and semantic validation of the set of instructions via an API prior to actual execution of the set of instructions.

A nineteenth aspect relates to the method of any preceding aspect, wherein the semantic validation comprises retrieving metadata from the datastore according to the set of instructions to check whether the dataset exists.

A twentieth aspect relates to the method of any preceding aspect, wherein an API for accessing the datastore via the set of instructions is configured to require that a user be specified with respect to the set of instructions.

A twenty-first aspect relates to the method of any preceding aspect, The method of claim 20, wherein an API is configured to reject users that do not have clearance in accessing the datastore.

A twenty-second aspect relates to the method of any preceding aspect, wherein the API is configured to inspect filters for user access level.

A twenty-third aspect relates to the method of any preceding aspect, wherein the API is further configured to maintain an audit log to track data access by users.

A twenty-fourth aspect relates to the method of any preceding aspect, wherein a query data source-aware data access open API is configured for accessing the datastore based a plug-in architecture.

A twenty-fifth aspect relates to the method of any preceding aspect, wherein the set of instructions are configured to provide type-safe data consumption of the datastore via type safe APIs.

A twenty-sixth aspect relates to the method of any preceding aspect, further comprising providing a front-end library for type-safe access of the data store via the set of instructions.

A twenty-seventh aspect relates to a system comprising processing circuitry configured to host an analytical application development platform to: provide a graphical application development user interface; receive a first user command from a user via the graphical application development user interface to insert a user interface component into an analytical application being constructed; identify a dataset retrievable from a datastore and consumable by the user interface component at a runtime of the analytical application via a second user command received in the graphical application development user interface; link the dataset to the user interface component; determine a set of instructions for retrieving the dataset from the datastore, the set of instructions being agnostic to underlying database technologies used in the datastore; link the set of instructions to the user interface component; and during the runtime of the analytical application and when instantiating the user interface component: convert the set of instructions into a series of database-specific queries; retrieve the dataset from the datastore based on the series of database-specific queries; and incorporate the dataset into the user interface component for display.

A twenty-eighth aspect relates to the system of aspect 27 wherein the set of instructions are expressed following syntactics of a common program language agnostic to the underlying database technologies.

A twenty-ninth aspect relates to the system of aspects 27-28, wherein the common program language comprises a JSON-like language.

A thirtieth aspect relates to the system of aspects 27-29, wherein: the user interface component comprises a table, a dropdown list, or a data chart; and the set of instructions specify at least one query operation for retrieving the dataset to populate the table, the dropdown list, or the data chart.

A thirty-first aspect relates to the system of aspects 27-30, wherein: the processing circuitry is further configured to: identify the datastore; and display at least one portion of the datastore in the graphical application development user interface; and the dataset is identified via the second user command from the at least one portion of the datastore displayed in the graphical application development user interface.

A thirty-second aspect relates to the system of aspects 27-31, wherein the second user command comprises a user drag-and-drop operation of a list visual representation of the dataset displayed in the graphical application development user interface into a working panel in the graphical application development user interface.

A thirty-third aspect relates to the system of aspects 27-32, wherein the datastore is identified via a data source definition separate from the set of instructions.

A thirty-fourth aspect relates to the system of aspects 27-33, wherein the data source definition further comprises a filter for enforcing security and data protection.

A thirty-fifth aspect relates to the system of aspects 27-34, wherein the set of instructions are merged with data source definition prior to being converted into the series of database-specific queries.

A thirty-sixth aspect relates to the system of aspects 27-35, wherein the processing circuitry is further configured to: in response to receiving a user choice of a data item within the dataset in the user interface component during the runtime of the analytical application, inject an additional filter associated with the data item into the set of instructions.

A thirty-seventh aspect relates to the system of aspects 27-36, wherein: the additional filter is subscribable by at least one additional user interface component of the analytical application; and the processing circuitry is further configured to provide a filter subscription mechanism for the at least one additional user interface component of the analytical application to effectuate runtime filtering in the at least one additional user interface component based on the additional filter upon the user choice of the data item in the user interface component.

A thirty-eighth aspect relates to the system of aspects 27-37, wherein the processing circuitry is further configured to: provide a live query subscription mechanism to the user interface component; and in response to detecting a change in the datastore that impacts the dataset associated with the user interface component and determining that the user interface component has subscribed to the live query subscription mechanism, refresh the dataset of the user interface component when connected to the datastore.

A thirty-ninth aspect relates to the system of aspects 27-38, wherein the datastore comprises a cluster of back-end nodes, the cluster of back-end nodes being configured with listen to and propagate changes on all nodes of the cluster of back-end nodes under a load balancer.

A fortieth aspect relates to the system of aspects 27-39, wherein a query data source-aware delta logic is configured in between the write model and the read model to, when the write model changes, optimize the read model updates such that read the read model updates are skipped when the read model does not use data associated with the write model.

A forty-first aspect relates to the system of aspects 27-40, wherein semantic write model changes are skipped in the read model updates.

A forty-second aspect relates to the system of aspects 27-41, wherein the processing circuitry is further configured to inject a use profiling filter into the set of instructions.

A forty-third aspect relates to the system of aspects 27-42, wherein the processing circuitry is further configured to cache the dataset after being received from the datastore during the runtime of the analytical application.

A forty-fourth aspect relates to the system of aspects 27-43, further comprising automatically performing syntactic and semantic validation of the set of instructions via an API prior to actual execution of the set of instructions.

A forty-fifth aspect relates to the system of aspects 27-44, wherein the semantic validation comprises retrieving metadata from the datastore according to the set of instructions to check whether the dataset exists.

A forty-sixth aspect relates to the system of aspects 27-45, wherein an API for accessing the datastore via the set of instructions is configured to require that a user be specified with respect to the set of instructions.

A forty-seventh aspect relates to the system of aspects 27-46, wherein an API is configured to reject users that do not have clearance in accessing the datastore.

A forty-eighth aspect relates to the system of aspects 27-47, wherein the API is configured to inspect filters for user access level.

A forty-ninth aspect relates to the system of aspects 27-48, wherein the API is further configured to maintain an audit log to track data access by users.

A fiftieth aspect relates to the system of aspects 27-49, wherein a query data source-aware data access open API is configured for accessing the datastore based a plug-in architecture.

A fifty-first aspect relates to the system of aspects 27-50, wherein the set of instructions are configured to provide type-safe data consumption of the datastore via type safe APIs.

A fifty-second aspect relates to the system of aspects 27-51, the processing circuitry is further configured to provide a front-end library for type-safe access of the data store via the set of instructions.

In addition to the features mentioned in each of the independent aspects enumerated above, some examples may show, alone or in combination, the optional features mentioned in the dependent aspects and/or as disclosed in the description above and shown in the figures.

What is claimed is:

1. A method performed by a processing circuitry in an application development platform for constructing an analytical application, the method comprising:
   providing a graphical application development user interface;
   receiving a first user command from a user via the graphical application development user interface to insert a user interface component into the analytical application;
   identifying a dataset retrievable from a datastore and consumable by the user interface component at a runtime of the analytical application via a second user command received in the graphical application development user interface;
   linking the dataset to the user interface component;
      determining a set of instructions for retrieving the dataset from the datastore, the set of instructions being agnostic to underlying database technologies used in the datastore;
      linking the set of instructions to the user interface component; and
   during the runtime of the analytical application and when instantiating the user interface component:
      converting the set of instructions into a series of database-specific queries; retrieving the dataset from the datastore based on the series of database-specific queries; and
      incorporating the dataset into the user interface component for display.

2. The method of claim 1, wherein the set of instructions are expressed following syntactics of a common program language agnostic to the underlying database technologies.

3. The method of claim 1, wherein:
   the method further comprises:
      identifying the datastore; and
      displaying at least one portion of the datastore in the graphical application development user interface; and
   the dataset is identified via the second user command from the at least one portion of the datastore displayed in the graphical application development user interface.

4. The method of claim 3, wherein the second user command comprises a user drag-and-drop operation of a list visual representation of the dataset displayed in the graphical application development user interface into a working panel in the graphical application development user interface.

5. The method of claim 1, wherein the method further comprises:
   in response to receiving a user choice of a data item within the dataset in the user interface component during the runtime of the analytical application, injecting an additional filter associated with the data item into the set of instructions.

6. The method of claim 5, wherein:
   the additional filter is subscribable by at least one additional user interface component of the analytical application; and
   the method further comprises:
      providing a filter subscription mechanism for the at least one additional user interface component of the analytical application to effectuate runtime filtering in the at least one additional user interface component based on the additional filter upon the user choice of the data item in the user interface component.

7. The method of claim 1, wherein the method further comprises:
   providing a live query subscription mechanism to the user interface component; and
   in response to detecting a change in the datastore that impacts the dataset associated with the user interface component and determining that the user interface component has subscribed to the live query subscription mechanism, refreshing the dataset of the user interface component when connected to the datastore.

8. The method of claim 1, wherein the datastore comprises a cluster of back-end nodes, the cluster of back-end nodes being configured to listen to and propagate changes on all nodes of the cluster of back-end nodes under a load balancer.

9. The method of claim 1, wherein a query data source-aware delta logic is configured in between a write model and a read model to, when the write model changes, optimize the read model updates such that read the read model updates are skipped when the read model does not use data associated with the write model.

10. The method of claim 1, wherein semantic write model changes are skipped in read model updates.

11. The method of claim 1, wherein the method further comprises injecting a use profiling filter into the set of instructions.

12. A system comprising processing circuitry configured to host an analytical application development platform to:
provide a graphical application development user interface;
receive a first user command from a user via the graphical application development user interface to insert a user interface component into an analytical application being constructed;
identify a dataset retrievable from a datastore and consumable by the user interface component at a runtime of the analytical application via a second user command received in the graphical application development user interface;
link the dataset to the user interface component;
determine a set of instructions for retrieving the dataset from the datastore, the set of instructions being agnostic to underlying database technologies used in the datastore;
link the set of instructions to the user interface component; and
during the runtime of the analytical application and when instantiating the user interface component:
convert the set of instructions into a series of database-specific queries;
retrieve the dataset from the datastore based on the series of database-specific queries; and
incorporate the dataset into the user interface component for display.

13. The system of claim 12, wherein the set of instructions are expressed following syntactics of a common program language agnostic to the underlying database technologies.

14. The system of claim 12, wherein:
the processing circuitry is further configured to:
identify the datastore; and
display at least one portion of the datastore in the graphical application development user interface; and
the dataset is identified via the second user command from the at least one portion of the datastore displayed in the graphical application development user interface.

15. The system of claim 12, wherein the second user command comprises a user drag-and-drop operation of a list visual representation of the dataset displayed in the graphical application development user interface into a working panel in the graphical application development user interface.

16. The system of claim 12, wherein the processing circuitry is further configured to:
in response to receiving a user choice of a data item within the dataset in the user interface component during the runtime of the analytical application, inject an additional filter associated with the data item into the set of instructions.

17. The system of claim 16, wherein:
the additional filter is subscribable by at least one additional user interface component of the analytical application; and
the processing circuitry is further configured to provide a filter subscription mechanism for the at least one additional user interface component of the analytical application to effectuate runtime filtering in the at least one additional user interface component based on the additional filter upon the user choice of the data item in the user interface component.

18. The system of claim 12, wherein the processing circuitry is further configured to:
provide a live query subscription mechanism to the user interface component; and
in response to detecting a change in the datastore that impacts the dataset associated with the user interface component and determining that the user interface component has subscribed to the live query subscription mechanism, refresh the dataset of the user interface component when connected to the datastore.

19. The system of claim 12, wherein the datastore comprises a cluster of back-end nodes, the cluster of back-end nodes being configured to listen to and propagate changes on all nodes of the cluster of back-end nodes under a load balancer.

20. The system of claim 12, wherein a query data source-aware delta logic is configured in between a write model and a read model to, when the write model changes, optimize the read model updates such that read the read model updates are skipped when the read model does not use data associated with the write model.

* * * * *